(12) United States Patent
Suryanarayana

(10) Patent No.: US 12,001,851 B2
(45) Date of Patent: Jun. 4, 2024

(54) POWER CONSERVATION AND STANDBY GRAPHICS RENDERING IN AN INFORMATION HANDLING SYSTEM

(71) Applicant: DELL PRODUCTS L.P., Round Rock, TX (US)

(72) Inventor: Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 53 days.

(21) Appl. No.: 17/963,239

(22) Filed: Oct. 11, 2022

(65) Prior Publication Data

US 2024/0118903 A1 Apr. 11, 2024

(51) Int. Cl.
G06F 9/00 (2006.01)
G06F 1/3234 (2019.01)
G06F 8/65 (2018.01)
G06F 9/4401 (2018.01)

(52) U.S. Cl.
CPC .......... *G06F 9/4403* (2013.01); *G06F 1/3234* (2013.01); *G06F 8/65* (2013.01)

(58) Field of Classification Search
CPC ......... G06F 9/4403; G06F 9/3234; G06F 8/65
See application file for complete search history.

(56) References Cited

U.S. PATENT DOCUMENTS

| | | | |
|---|---|---|---|
| 2012/0254602 A1* | 10/2012 | Bhansali | G06F 21/31 713/2 |
| 2016/0314758 A1* | 10/2016 | Moyes | G09G 5/001 |
| 2019/0265776 A1 | 8/2019 | Montero et al. | |
| 2021/0256652 A1 | 8/2021 | Suryanarayana et al. | |

* cited by examiner

*Primary Examiner* — Nitin C Patel
(74) *Attorney, Agent, or Firm* — Larson Newman, LLP

(57) ABSTRACT

An information handling system includes a basic input/output system (BIOS), multiple graphics processing units (GPUs), and an advanced graphics synchronization node (AGN). The BIOS initiates boot operations for the information handling system. During a pre-extensible firmware interface phase of the boot operations, the BIOS initializes a video memory associated with the GPUs. During the boot operations, the AGN generates a firmware override table based on data in the video memory, and a redirection override table based on the data in the video memory. During operating system runtime operations, the AGN utilizes the firmware override table to synchronize outputs from the GPUs, and utilizes the redirection override table to enable a firmware update for one of the GPUs without a reboot of the information handling system.

13 Claims, 5 Drawing Sheets

POWER CONSERVATION AND STANDBY GRAPHICS RENDERING IN AN INFORMATION HANDLING SYSTEM

FIELD OF THE DISCLOSURE

The present disclosure generally relates to information handling systems, and more particularly relates power conservation and standby graphics rendering.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system (BIOS), multiple graphics processing units (GPUs), and an advanced graphics synchronization node (AGN). The BIOS may initiate boot operations for the information handling system. During a pre-extensible firmware interface phase of the boot operations, the BIOS may initialize a video memory associated with the GPUs. During the boot operations, the AGN may generate a firmware override table based on data in the video memory, and generate a redirection override table based on the data in the video memory. During operating system runtime operations, the AGN may utilize the firmware override table to synchronize outputs from the GPUs, and utilize the redirection override table to enable a firmware update for one of the GPUs without a reboot of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
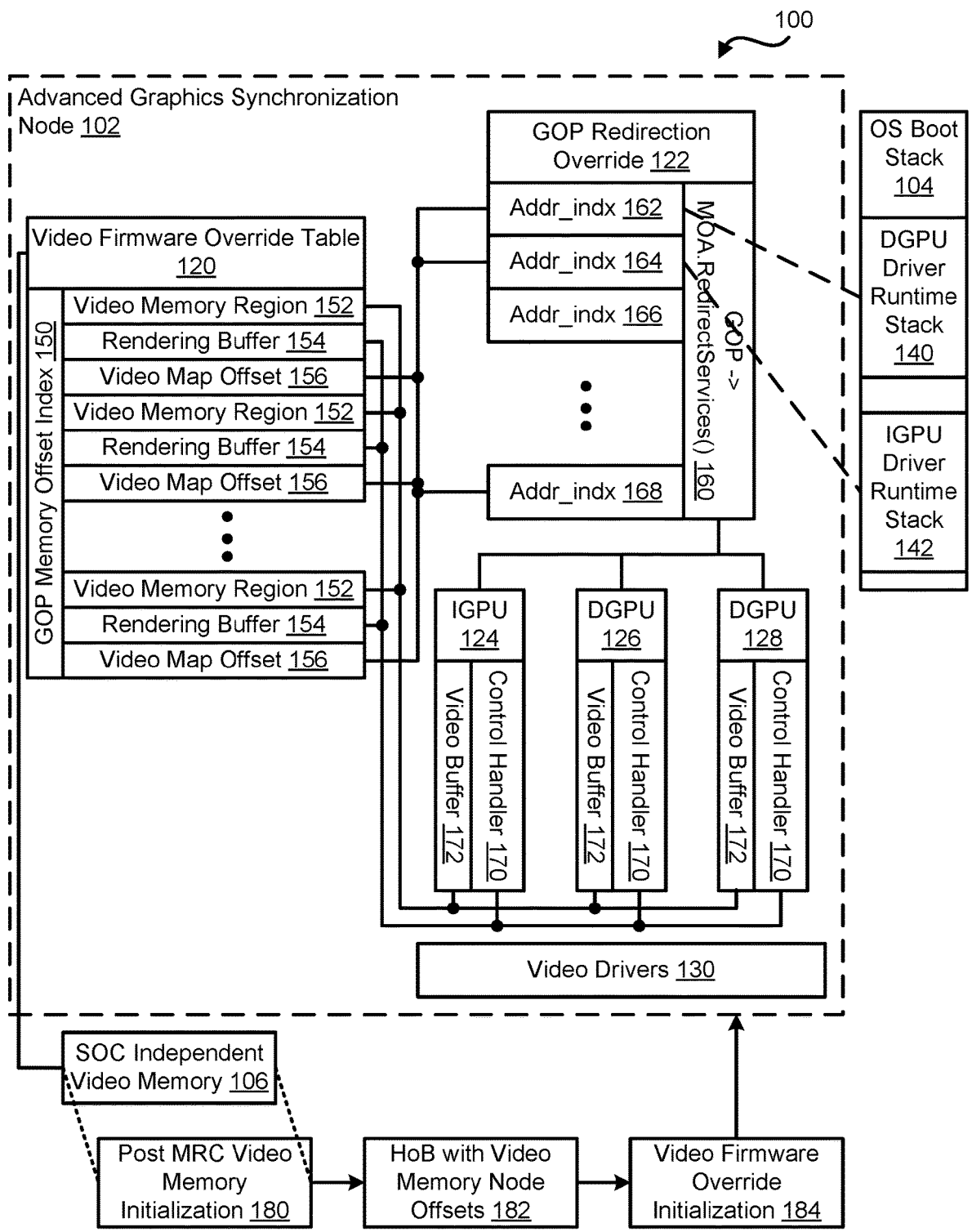
FIG. 1 is a block diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes an advanced graphics synchronization node (AGN) 102, an operating system (OS) stack 104, and a video memory 106. AGN 102 includes a video firmware override table 120, a redirection override 122, and multiple graphics processing units (GPUs). In certain examples, the GPUs may include in combination of integrated GPUs (IGPUs) and discrete GPUs (DGPUs). For example, AGN 102 includes an IGPU 124 and DGPUs 126 and 128. AGN 102 further includes video drivers 130. OS boot stack 104 includes a DGPU driver runtime stack 140 and an IGPU driver runtime stack 142. Video firmware override table 120 includes a memory offset index 150, which in turn may include multiples video memory regions 152, multiple rendering buffers 154, and multiple video map offsets 156. Redirection override 122 includes a call function 160, and multiple address indexes 160, 164, 166, and 168. Each of IGPU 124 and DGPUs 124, 126, 128 includes a control handler 170 and a video buffer 172. In an example, video memory 106 may be any suitable video memory, such as a system on a chip (SOC) independent video memory. Information handling system 100 may include additional components, such as basic input/output system (BIOS) 540 and processors 502 and 504 of FIG. 5, without varying from the scope of this disclosure.

AGN 102 may be utilized to render graphics on a display of information handling system 100. In an example, AGN 102 may be a graphics card or other component within information handling system 100. During operation of information handling system 100, AGN 100 may consume a large amount of power to render the graphics provided to a display, such as display 534 of FIG. 4. Previous information handling systems may not be able to provide a power efficient uninterrupted graphics rendering during graphics updates, based on particular GPU memory limitations, during high GPU heat conditions, during extreme gaming, or the like.

In particular, when previous information handling systems run graphics intensive applications, these information handling systems may experience a blue screen of death (BSOD), a system hang, display lag, or the like. Previous information handling systems may also have a distorted or stretched display based on non-synchronized GPU buffers across IGPUs and DGPUs. The distortion may increase when an information handling system is a laptop connected to an external monitor and the information handling system switches being open and closed positions. In previous information handling systems, a system crash may occur after unstable rendering when connected to multi-monitor displays, a screen blackout, glitches while mouse cursor movement, or the like.

Previous information handling systems may experience thermal issues due to advanced configuration and power interface (ACPI) video line arrays not having override violations at the same time the group of pictures (GOP) rendering is stopped. In other situations, previous information handling systems may include third graphics hardware within compatible drivers that fail to create a GOP node such that graphics re-initialization may consistently fail during a system reboot. Previous information handling systems may support multiple monitors with different resolutions, such as 4K, high-definition (HD), and ultra-high definition (UHD). However, these previous information handling systems may not have an intelligence to efficiently use IGPU and DGPU synchronization video. In this situation, previous information handling systems may end up rendering visibly noticeable differing resolutions across which is bad experience. Information handling system 100 may be improved by AGN 102 dynamically creating pre-boot firmware override GOP table 120 to support graphics third party hardware upgrades with seamless driver updates and synchronizations without having platform reboot. As used herein, third party hardware refers to hardware components within information handling system 100 that are manufactured by a company that is different than the company that manufactured the information handling system.

In an example, one or more components of information handling system 100, such as AGN 102, a BIOS, and a processor, may perform any suitable operations to dynamically create video firmware override table 120 during pre-boot of the information handling system. For example, a BIOS, such as BIOS 540 of FIG. 5, may perform memory reference code (MRC) video memory initialization 180 to initialize video memory 106. In certain examples, MRC video memory initialization 180 may include initializing memory settings, frequency, timing, driving and detailed operations of a memory controller with respect to video memory 106.

During the pre-boot operations, the BIOS may calculate or determine video memory node offset values at operation 182. In an example, operation 182 may be executed in connection with a hand-off block (HOB). In this example, the HOB may be utilized to pass execution of pre-boot operations from BIOS to AGN 102. At operation 184, video firmware override table 120 is initialized. During operation 184, AGN 102 may read data from video memory 106 and store the data in video firmware override table 120 as group of pictures (GOP) memory offset index 150 entries in video firmware override table 120. In certain examples, this data may include, but is not limited to, video memory regions 152 of video memory 106, rendering buffers 154, and video map offsets 156.

In an example, each video memory region 152 of video firmware override table 120 may be associated with or map to a different graphic hardware device, such as a CPU, iGPU 124 and dGPUs 126 and 128. Each rendering buffer 154 may be mapped to a memory of IGPU 124. In an example, video memory regions 152 and rendering buffers 154 in video firmware override table 120 may be utilized to align video buffers 172 of each of IGPU 124 and DGPUs 126 and 128 on a common video map, which in turn may synchronize the video rendering among the GPUs even when the GPUs have different manufacturers. In an example, based on IGPU 124 and DGPUs 126 and 128 having different manufacturers, the GPUs are referred to herein as heterogeneous GPUs that each have different firmware and drivers. The synchronization among video buffers 172 of IGPU 124 and DGPUs 126 and 128 may prevent distorted or stretched displays, prevent information handling system 100 crashes when one or the GPUs is overclocked, or the like. For example, if one of IGPU 124 and DGPUs 126 and 128 is overclocked, the common video map in memory offset index 150 of video firmware override table 120 may synchronize video buffers 172 of IGPU 124 and DGPUs 126 and 128 based on the overclocking. In this example, AGN 102 may enable one or more GPU memory clock frequencies to be dynamically altered without requiring a boot of information handling system 100. In an example, these operations of AGN 102 may eliminate a crash of information handling system 100 after a clock frequency change.

In an example, video map offsets 156 may enable mapping of internal memory locations to external memory locations irrespective of video drivers 130 for IGPU 124 and DGPUs 126 and 128 based on GOP redirected override 122. For example, GOP→MOA.RedirectServices( ) 160 may be called for each graphics unit, such as IGPU 124 and DGPU 126 and 128, during initialization so that an address space may be allocated in the OS runtime stack. For example, address space or index 162 in GOP redirection override 122 may be mapped to DGPU driver runtime stack 140 such that AGN 102 may support DGPU 128 hardware upgrades with seamless driver 130 updates and synchronizations without having to perform a platform reboot. Similarly, address space or index 164 in GOP redirection override 122 may be mapped to IGPU driver runtime stack 142 such that AGN 102 may support IGPU 124 hardware upgrades with seamless driver 130 updates and synchronizations without having to perform a platform reboot. In an example, updates to video drivers 130 may be stored within corresponding driver runtime stack 140 or 142, such that the updates may be performed during OS runtime without a platform reboot of information handling system 100.

Based on video drivers 130 or firmware versions for IGPU 124 and DGPUs 126 and 128, video firmware override table 120 may dynamically update or populate the video attributes in video memory regions 152, rendering buffers 154, and video map offsets 156. In this example, the dynamic update of the video attributes in video firmware override table 120 may enable seamless update and recovery of firmware from different GPU manufacturers. In certain examples, video memory initialization is performed during the MRC boot phase so that the frame overrides and update logic may be accepted by AGN 102. In an example, MRC boot phase also dynamically enables heterogeneous device support by reinitialize capabilities of AGN 102. Based on AGN 102 not needed a platform reboot the graphics alignments and extensions may be performed uninterruptedly in the AGN.

Figure 2:
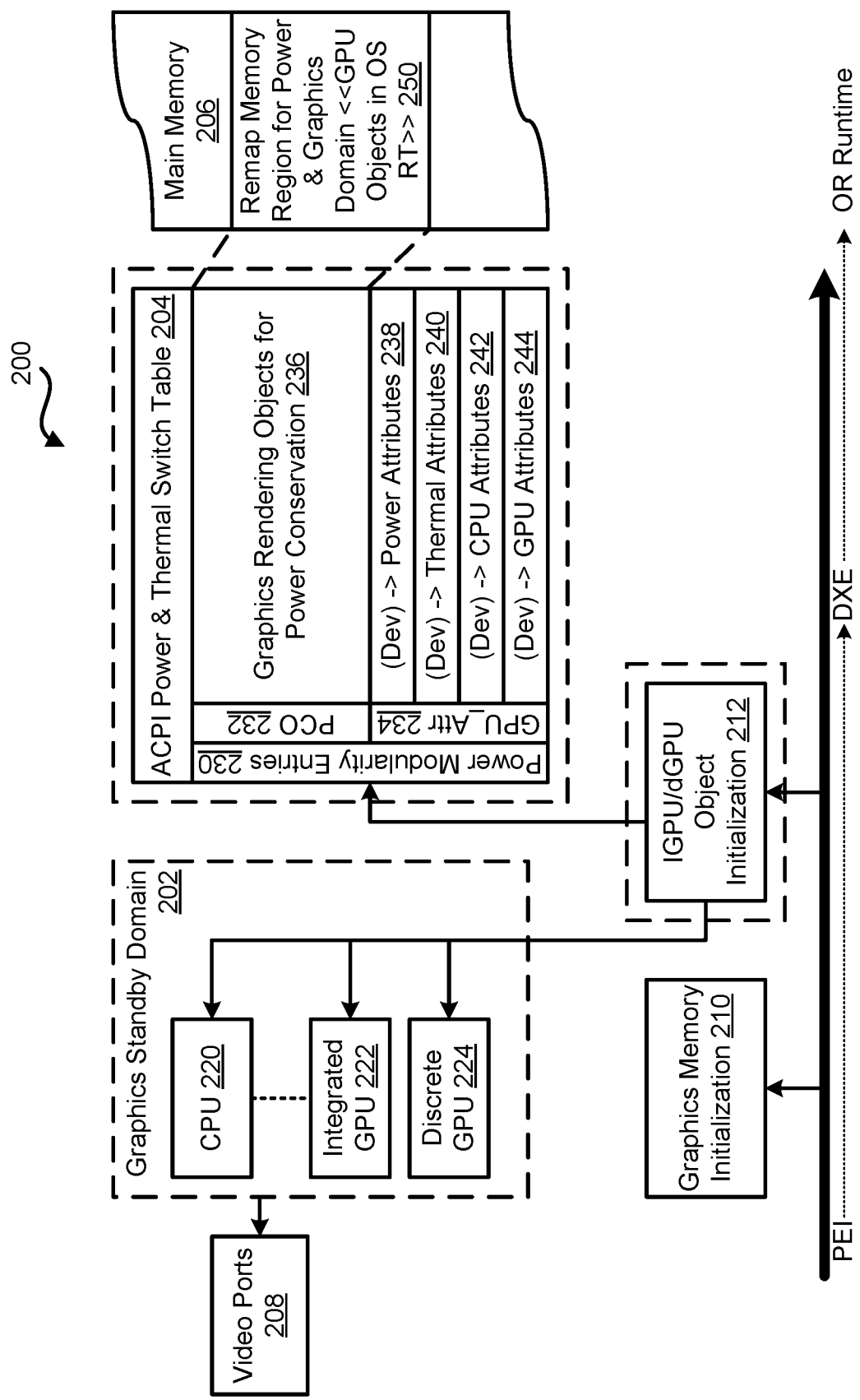
FIG. 2 is a block diagram of another portion of an information handling system according to at least one embodiment of the present disclosure.

FIG. 2 is a portion of an information handling system 200 including a graphics standby domain 202, an ACPI power and thermal switch table 204, a main memory 206, and video ports 208. A boot flow can include multiple of phases, such as a pre-Extensible Firmware Interface (PEI) phase and a driver execution environment (DXE) phase. In an example, the PEI phase can include initializing a processor, initializing main memory 206, initializing a management controller or another memory controller, initializing GPU objects, other functions, or any combination thereof. In certain examples, the DXE phase can begin after the management controller or other memory controller is initialized such that a write driver can be executed to write data to memory 206. In an example, graphics memory initialization 210 and GPU object initialization 212 may be perform during the PEI phase as shown in FIG. 2.

Graphics standby domain 202 includes CPU 220, IGPU 222, and DGPU 224. ACPI power and thermal switch table 204 includes power modularity entries 230, which in turn includes power conservation objects (PCO) 232 and GPU attributes 234. PCO 232 includes graphics rendering objects for power conservation 236. GPU attributes 234 includes power attributes 238, thermal attributes 240, CPU attributes 242, and GPU attributes 244. Main memory 206 includes a remap memory region 250. Information handling system 200 may include additional components, such as BIOS 540 and processors 502 and 504 of FIG. 5, without varying from the scope of this disclosure.

In an example, information handling system 200 may be improved by AGN 102 dynamically creating PCO 232, which in turn may dynamically recreate power modularity entries 230 in ACPI table 204, to provide a conserved power advanced graphics rendering. In certain examples, graphics memory initialization 210 may be performed at very early PEI phase of the boot operations. In response to graphics memory initialization 210 being performed early in the PEI phase, GPU object initialization 212 may be performed during a later portion of the PEI phase. In an example, GPU object initialization 212 may include both IGPU objects and DGPU objects for information handling system 200. Based on the graphics memory initialization 210 and GPU object initialization 212 being performed during the PEI phase, these objects may be extended into ACPI power and thermal switch table 204 by passing a HOB into the DXE phase.

In certain examples, every available graphics unit, such as CPU 220, IGPU 222, and DGPU 224, is associated with a different power modularity entry 230 within ACPI power and thermal switch table 204. In this example, each graphics unit has a different PCO 232 and attributes 234. In certain examples, ACPI power and thermal switch table 204 may include as many sets of PCO 232 and GPU attributes 234 as rendering devices in information handling system 200. For clarity and brevity, only a single set of PCO 232 and GPU attributes 234 have been illustrate in FIG. 2 and described herein. In an example, ACPI power and thermal switch table 204 may be dynamic, such that CPU 220, IGPU 222, and DGPU 224 may handle any runtime graphics rendering with memory slicing or transfer across heterogeneous vendor devices. As used herein, vendor devices refer to the manufacturer for the device, such as IGPU 222 and DGPU 224. In an example, the power attributes 238 and thermal attributes 240 for CPU 220, IGPU 222, and DGPU 224 may dynamically render the video at OS runtime along by plotting the power conservation with dynamic standby sensing idle states and thereby to provide power conservation with advanced graphics rendering.

In an example, CPU 220 may execute any suitable operations based on a standby graphics rendering protocol (SGRP) to dynamically sense idle states and peek rendering periods of IGPU 222 and DGPU 224. Based on the dynamically tracked states, CPU 220 may maintain standby statuses for IGPU 222 and DGPU 224 while also maintaining a continuous display status at video ports 208 to provide uninterrupted graphics operations without exceeded thermal thresholds. PCO 232 may create a power efficient smoother graphics rendering across multiple monitors that have varied resolutions within information handling system 200.

In certain examples, ACPI power and thermal switch table (ACPI table) 204 may be accessible to CPU 220 during OS runtime of information handling system 200. Based on current power and thermal values within information handling system 200, CPU 220 dynamically update power modularity entries 230 for each GPU, such as IGPU 222 and DGPU 224. In an example, CPU 220 may utilized a graphics translation table (GTT) linked to ACPI table 204 to reinitialize video frame rendering and issue graphic standby operations based on heat/stress levels of the devices within information handling system 200. Based on GTT calls, CPU 220 may ensure uninterrupted graphics rendering by GPUs 222 and 224 on video ports 208, and ensure that the power and thermal value thresholds are not exceeded. In an example, if the power and thermal value thresholds were exceeded, the graphics rendering by GPUs 222 and 224 would break, such that the output on video ports 208 would hang. Thus, the GTT calls by CPU 220 may prevent graphic display hangs on video ports 208.

In an example, IGPU 222 and DGPU 224 may utilize the respective power modularity entries 230 in ACPI table 204 to handle graphics rendering during different conditions. For example, if a video being rendered by IGPU 222 is still, the IGPU may utilize the graphics rendering objects 236 to enable graphics standby. In this example, the still images do not need to be the entire frame buffer for IGPU 222, but may be only a portion of the frame buffer. In an example, the memory region and video map for IGPU 222 may be driven by APCI table 204, which in turn also handles power and thermal attributes for IGPU 222. In this situation, the standby graphics generated by IGPU 222 based on APCI table 204 may ensure proper thermal and power values for IGPU 222. While standby graphics and thermal and power values have be described with respect to IGPU 222, these operation may be performed with respect to any GPU in information handling system 200, such as DGPU 224, without varying from the scope of this disclosure.

In a particular embodiment, device specific GTT calls (DS_GTT) may be called with respect to both IGPU 222 and DGPU 224 contexts and may handle dynamic remapping as well as re-initializing and reloading respective rendering buffers. An exemplary flow of DS_GTT calls with comments is provided Table 1 below:

TABLE 1

| DS_GTT Call | Comment |
| --- | --- |
| DS_GTT->GPU_RA_to_PA.getDMAPage( ) | //!< Remap Address to GPU device address-read graphics rendering |
| DS_GTT->GPU_RA_to_PA.setDMAPage( ) | //!< Remap Address to GPU device address-write graphics rendering |
| DS_GTT->GPU_PA_to_RA.getDMAPage( ) | //!< GPU device address to Remap Address-read graphics rendering |
| DS_GTT->GPU_PA_to_RA.setDMAPage( ) | //!< GPU device address to Remap Address-write graphics rendering |
| DS_GTT->GPU_RA.reinitVideoDMAPages( ) | //!< Reinitialize video DMA pages |
| DS_GTT->GPU_RA.reinitVideoFrameBuffer( ) | //!< Reinitialize the video frame buffer |

In an embodiment, if a GPU rendering hangs, dynamic re-initialization to reload the render buffer with DS_GTTs may re-enumerate a display buffer without interruption. An exemplary flow of DS_GTT calls with comments is provided Table 2 below:

TABLE 2

| DS_GTT Call | Comment |
| --- | --- |
| [drm] GPU HANG: ecode 8:0:0x654378fff4 | Reason: Hang on render ring buffer, only action reboot |
| [drm] GPU HANG: indicate a bug in entire gfx stack | |
| [drm] DS_GTT_Recover: Load Addr 6:8:0xCF68000FFFA2 | Reinitialize RA video frame |
| [drm] DS_GTT_Recover: Load Addr 6:8:0xCF68000FFFF4 | Reload RA_VideoDMAPages with rendering context |
| [drm] GPU: Start Func code 8:0:0x654378FFF4 | Re-enumerate and display load to function |
| [drm] GPU: Render Func code 8:0:0x654398FFF8 | Continuous display as normal |

Figure 3:
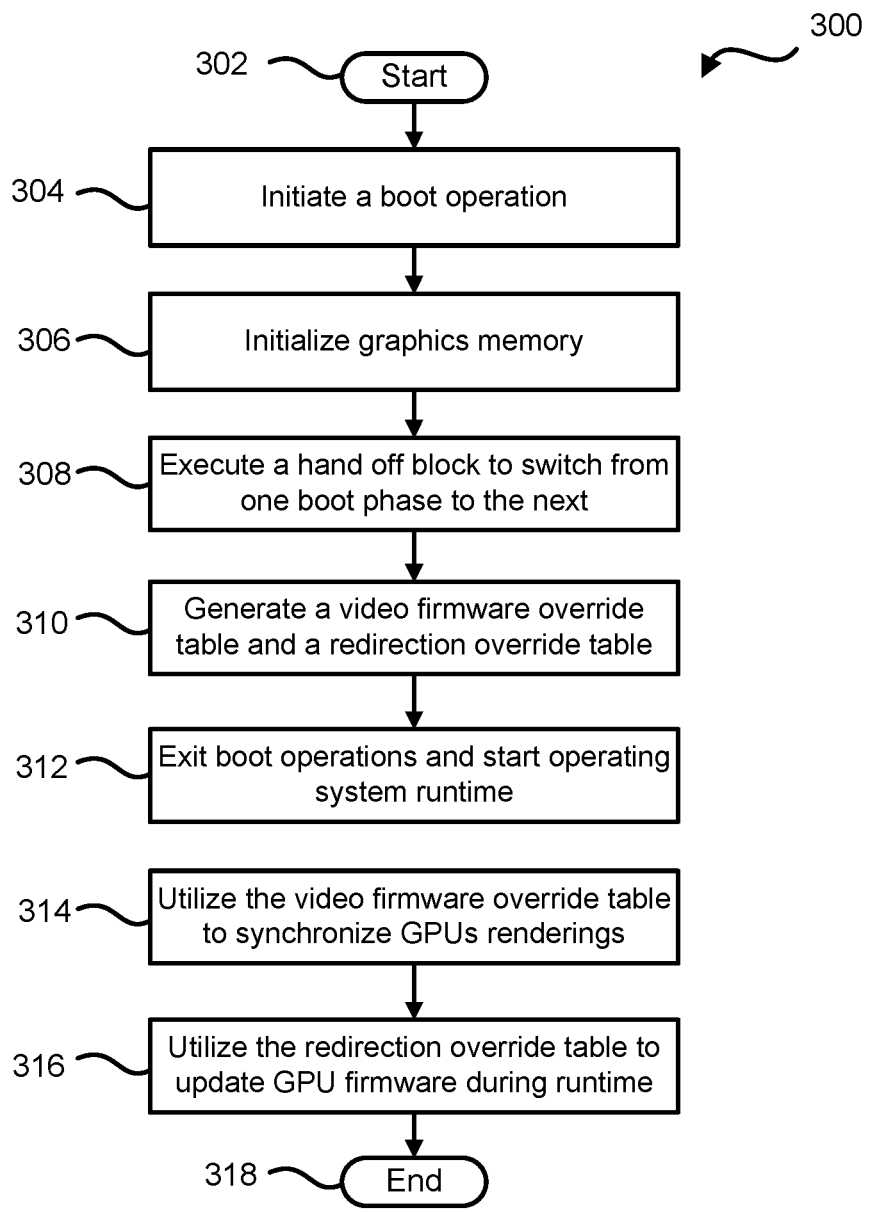
FIG. 3 is a flow diagram of a method for utilizing a video firmware override table to synchronize graphic processing unit renderings and to update graphic processing unit firmware updates during runtime according to at least one embodiment of the present disclosure.

FIG. 3 shows a method 300 for utilizing a video firmware override table to synchronize graphic processing unit renderings and to update graphic processing unit firmware updates during runtime according to at least one embodiment of the present disclosure, starting at block 302. In an example, the method 300 may be performed by any suitable component including AGN 102 of FIG. 1, BIOS 540 of FIG. 5, and processors 502 and 504 of FIG. 5. Not every method step set forth in this flow diagram is always necessary, and certain steps of the methods may be combined, performed simultaneously, in a different order, or perhaps omitted, without varying from the scope of the disclosure.

At block 304, a boot operation of an information handling system is initiated. At block 306, a graphics or video memory is initialized. In an example, the video memory may be initialized during a PEI phase of the boot operation. At block 308, a HOB is executed to switch from one boot phase to a next boot phase. In an example, the HOB may also switch execution of the boot code from a BIOS to an AGN.

At block 310, a video firmware override table and a redirection override table are generated. In an example, the firmware override table and redirection override table may be generated by the AGN of the information handling system. The data in the firmware override table may be received from the video memory initialized during an earlier boot phase. In certain examples, the video firmware override table may include multiple video memory region entries, multiple rendering buffer entries, multiple video map offset entries, or the like.

At block 312, boot operations are exited and OS runtime operations begin. At block 314, the video firmware override table is utilized to synchronize GPUs rendering outputs. For example, a common video map in a memory offset index of video firmware override table may synchronize video buffers multiple GPUs in the information handling system. In an example, the GPUs may be heterogeneous GPUs. At block 316, the redirection override table is utilized to perform GPU firmware updates during runtime, and the flow ends at block 318. In an example, the GPU firmware updates may be performed during runtime with a reboot of the information handling system. For example, an address space or index in the redirection override may be mapped to a GPU driver runtime stack such that the AGN may support the firmware updates without having to perform a platform reboot.

Figure 4:
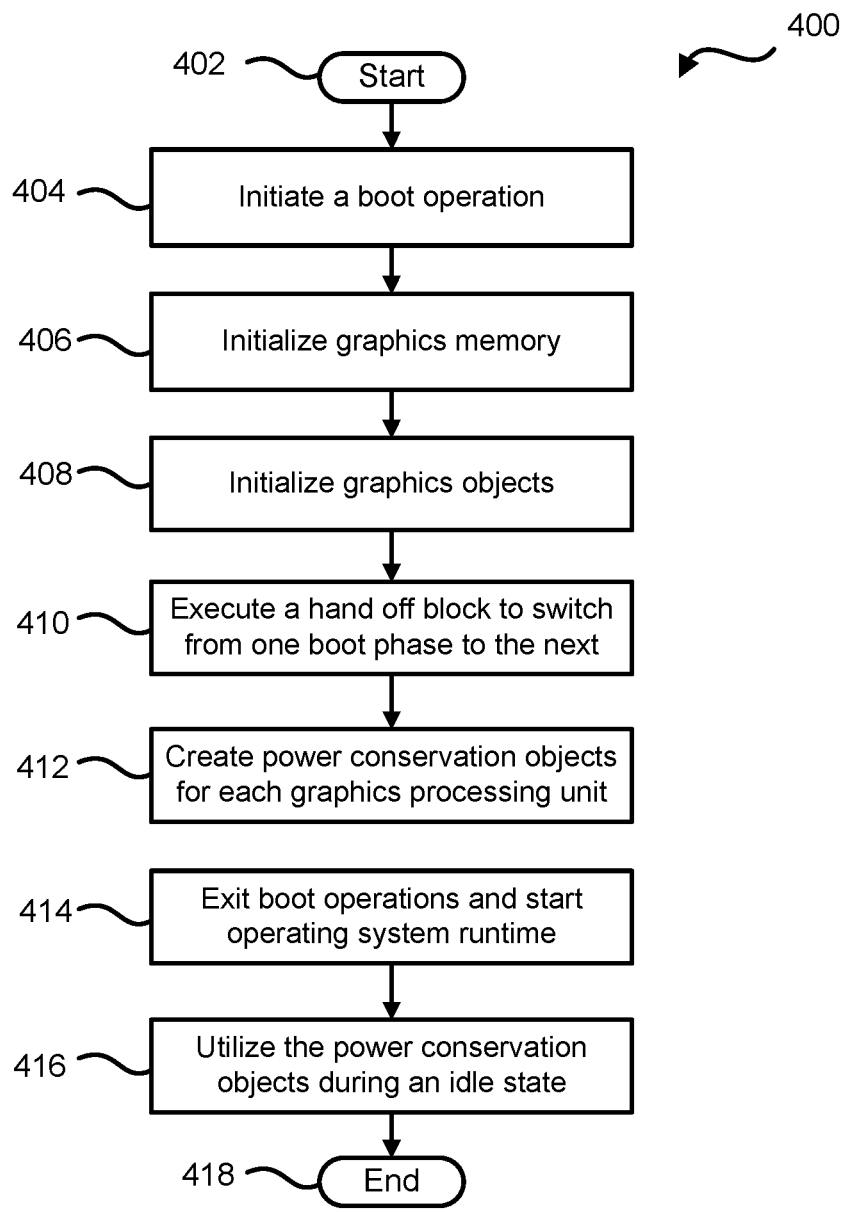
FIG. 4 is a flow diagram of a method for utilizing power conservation objects for a graphics processing unit during an idle state according to at least one embodiment of the present disclosure.

FIG. 4 is a flow diagram of a method 400 for utilizing power conservation objects for a graphics processing unit during an idle state according to at least one embodiment of the present disclosure, starting at block 402. In an example, the method 300 may be performed by any suitable component including, but not limited to, AGN 102 of FIG. 1, BIOS 540 of FIG. 5, and processors 502 and 504 of FIG. 5. Not every method step set forth in this flow diagram is always necessary, and certain steps of the methods may be combined, performed simultaneously, in a different order, or perhaps omitted, without varying from the scope of the disclosure.

At block 404, a boot operation of an information handling system is initiated. At block 406, a graphics or video memory is initialized. In an example, the video memory may be initialized during an early portion of a PEI phase of the boot operation. At block 408, GPU objects are initialized or generated. In an example, the GPU object may be initialized during a late portion of the PEI phase.

At block 410, a HOB is executed to switch from one boot phase to a next boot phase. In an example, the boot operation may switch from the PEI phase to a DXE phase. At block 412, PCOs are generated for each GPU in the information handling system. In an example, the GPUs may be heterogeneous GPUs. In certain examples, the PCOs are stored in an ACPI power and thermal switch table. At block 414, boot operations are exited and OS runtime operations begin. At block 416, the PCOs are utilized during an idle state of one or more of the GPUs, and the flow ends at block 418. In an example, the PCO for a GPU may be utilized to generate a standby graphic to ensure proper thermal and power values for the GPU.

Figure 5:
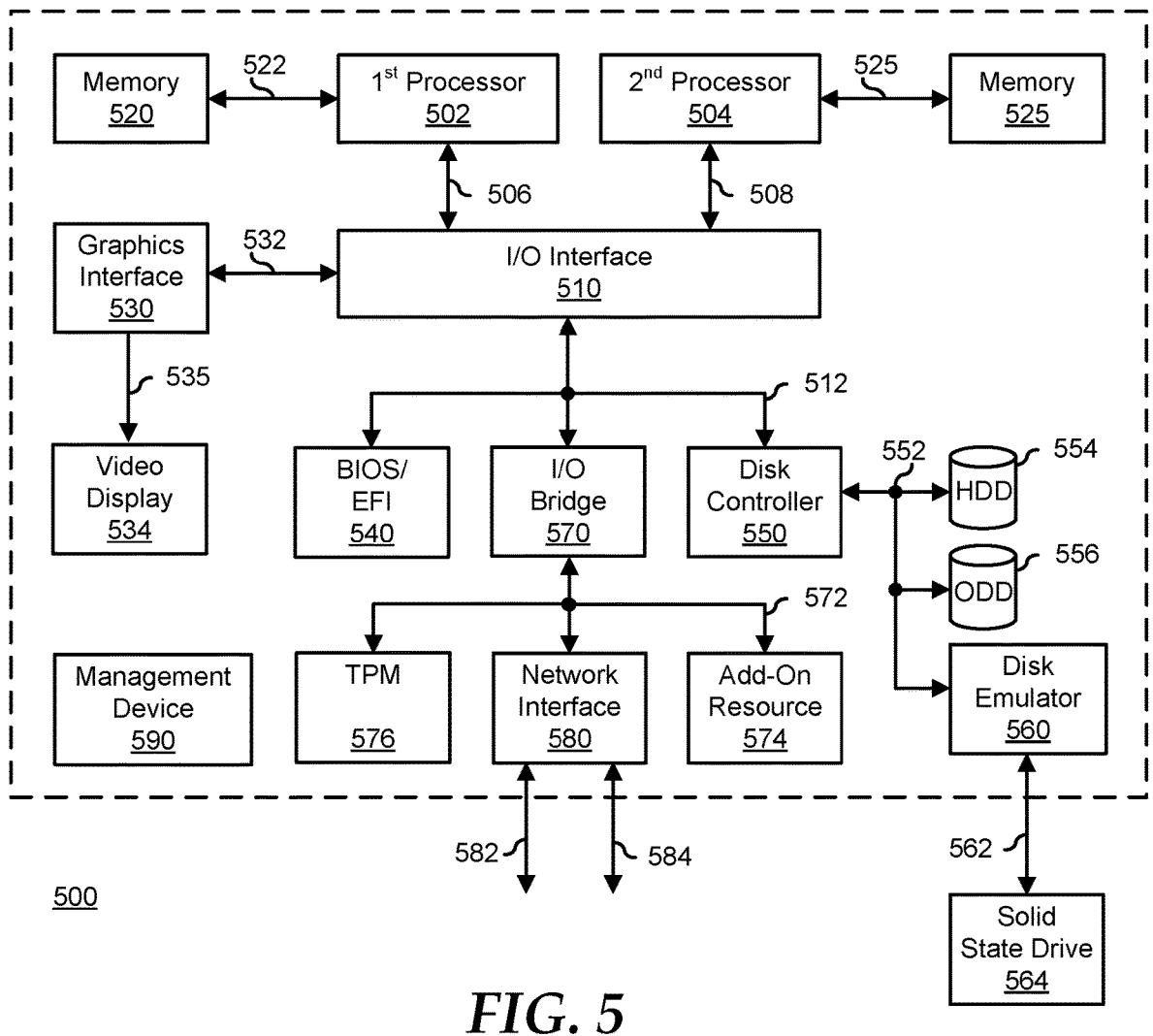
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
a plurality of graphic processing units (GPUs); and
a basic input/output system (BIOS) to communicate with the GPUs, the BIOS to:
  initiate boot operations for the information handling system; and
  during a pre-extensible firmware interface phase of the boot operations, the BIOS to initialize a video memory associated with the GPUs; and
an advanced graphics synchronization node (AGN) to communicate with the BIOS, the AGN to:
  during the boot operations:
    generate a firmware override table based on data in the video memory; and
    generate a redirection override table based on the data in the video memory; and
  during operating system runtime operations:
    utilize the firmware override table to synchronize outputs from the GPUs; and
    utilize the redirection override table to enable a firmware update for one of the GPUs without a reboot of the information handling system.

2. The information handling system of claim 1, wherein the AGN further to utilize a common video map in a memory offset index of video firmware override table to synchronize video buffers in the GPUs.

3. The information handling system of claim 1, wherein the AGN further to utilize an address space in the redirection override to enable the firmware update without having to perform the reboot, wherein the address space is mapped to a GPU driver runtime stack associated with the one of the GPUs.

4. The information handling system of claim 1, wherein the BIOS further to execute a hand-off-block to pass execution of the boot operations to the AGN.

5. The information handling system of claim 1, wherein the video firmware override table includes multiple video memory region entries, multiple rendering buffer entries, multiple video map offset entries.

6. The information handling system of claim 1, wherein the GPUs are heterogeneous GPUs.

7. The information handling system of claim 1, wherein the GPUs include an integrated GPU and a discrete GPU.

8. A method comprising:
initiating, by a basic input output system of an information handling system, boot operations for the information handling system;
during a pre-extensible firmware interface (PEI) phase of the boot operations, initializing a video memory associated with multiple graphic processing units in the information handling system;
during the boot operations:
  generating, by an advanced graphics synchronization node (AGN) of the information handling system, a firmware override table based on data in the video memory; and generating a redirection override table based on the data in the video memory; and during operating system runtime operations:
utilizing the firmware override table to synchronize outputs from the GPUs; and
utilizing the redirection override table to enable a firmware update for one of the GPUs without a reboot of the information handling system.

9. The method of claim 8, further comprising utilizing a common video map in a memory offset index of video firmware override table to synchronize video buffers in the GPUs.

10. The method of claim 8, further comprising utilizing an address space in the redirection override to enable the firmware update without having to perform the reboot, wherein the address space is mapped to a GPU driver runtime stack associated with the one of the GPUs.

11. The method of claim 8, further comprising executing a hand-off-block to pass execution of the boot operations to the AGN.

12. The method of claim 8, wherein the GPUs are heterogeneous GPUs.

13. The method of claim 8, wherein the GPUs include an integrated GPU and a discrete GPU.

* * * * *